US009707831B2

(12) United States Patent
Heirtzler et al.

(10) Patent No.: US 9,707,831 B2
(45) Date of Patent: Jul. 18, 2017

(54) ACTIVE GLASS RETENTION SYSTEM (71) Applicant: Ford Global Technologies, LLC, Dearborn, MI (US)

(72) Inventors: Paul L. Heirtzler, Northville, MI (US); Donald P. Iacovoni, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 22 days.

(21) Appl. No.: 14/824,236

(22) Filed: Aug. 12, 2015

(65) Prior Publication Data

US 2017/0043649 A1    Feb. 16, 2017

(51) Int. Cl.
*B60J 5/04* (2006.01)
*B60J 1/17* (2006.01)
*B60J 10/763* (2016.01)

(52) U.S. Cl.
CPC .............. *B60J 5/0468* (2013.01); *B60J 1/17* (2013.01); *B60J 10/763* (2016.02)

(58) Field of Classification Search
CPC ... B60J 1/17; B60J 10/04; B60J 10/046; B60J 10/047; B60J 10/048; B60J 10/06; B60J 5/0468; B60J 10/763
See application file for complete search history.

(56) References Cited

U.S. PATENT DOCUMENTS

| 5,050,349 A | 9/1991 | Goto et al. |
| 7,866,727 B2 | 1/2011 | Fuetterer |
| 8,887,445 B2 | 11/2014 | Patterson |

FOREIGN PATENT DOCUMENTS

DE    102008056050    5/2010

*Primary Examiner* — Glenn Dayoan
*Assistant Examiner* — Melissa A Black
(74) *Attorney, Agent, or Firm* — Jason Rogers; Price Heneveld LLP (57) ABSTRACT

A retaining system for a motor vehicle includes a vehicle body having a door opening with a frame disposed therearound. A door is mounted adjacent the door opening and includes a vertically moveable frameless window. An actuator is coupled to the frame and further coupled to a retainer member. The retainer member is moveable between engaged and disengaged positions relative to the frameless window as powered by the actuator. A controller is configured for determining whether an instantaneous vehicle condition is met or present, and moving the retainer member to the engaged position to retain the frameless window against the frame or vehicle body when the vehicle condition is detected. The vehicle condition may include a predetermined vehicle speed, an aerodynamic pressure reading, a direct aerodynamic pressure or vacuum, a door lock activation, or other like condition for detection by the controller.

15 Claims, 8 Drawing Sheets

ACTIVE GLASS RETENTION SYSTEM

FIELD OF THE INVENTION

The present invention relates to a retention system for a vehicle window, and more particularly, to a retention system for a frameless window disposed on a vehicle door.

BACKGROUND OF THE INVENTION

Conventional "framed" side doors on passenger vehicles generally include a structural member extending around the top of the side window, typically referred to as a door frame. Among other things, the door frame provides support for glass run seals which in turn provide support and sealing function to the door glass when the glass is in the up position. Some vehicles have "frameless" door systems that do not have any structural member above the belt line to support the glass. These are typically used on vehicles with a folding or removable (convertible) top so that when the top is stowed and side windows are down there is unobstructed view out of the vehicle. Frameless doors are also used on some coupes and sedans to achieve certain styling objectives. On vehicles with frameless door systems, the upper edge of the door glass mates to a weather strip that is mounted to the vehicle body to provide sealing function. In order to maintain proper ability to open and close the door, the glass must be able to swing in and out of this weather strip freely. This architectural condition presents challenges to achieving desired water and air leakage (wind noise) performance, particularly at high vehicle speeds (80+ MPH). At these high speeds, aerodynamic loads on the glass tend to pull the glass away from the body, potentially reducing the ability to seal the vehicle (also known as glass "blow-out").

Previous generations of frameless door systems relied on significant inboard preload of the glass into the body mounted weather strip to provide adequate sealing pressure and resistance to aerodynamic glass "blow out". High levels of preload can cause premature seal wear during glass cycling, as well as other undesirable issues. A more modern solution has been to use an "indexing" window regulator system. Generally, these systems drop the side glass a short distance when the door is opened, then fully close it again when the door is closed. This changes the direction of glass engagement with the weather strip and allows overlap between the glass and a seal structural member (a.k.a. seal retainer) to help resist aerodynamic loads on the glass while maintaining door open ability. These indexing systems can generally provide a robust balance of glass "blow-out" performance and door open-ability. They also generally allow for relatively unhindered door opening even if the indexing system is not functioning, a characteristic that is especially important for egress of passengers after an accident. Even with the availability of modern indexing systems, achieving a balance between acceptable aerodynamic glass blow-out performance and door open-ability may be more challenging in some situations.

The following examples describe situations in which door opening abilities can be a challenge. 1.) In some vehicles with extremely high top speeds, the resulting higher aerodynamic loading on the glass may require increased engagement with the seal structural member, which in turn may result in issues with door open-ability (glass catching or dragging on seal structural member etc.). 2.) The automotive industry is moving toward thinner glass panels (for weight savings) and laminated glass constructions (for acoustic performance) which result in lower glass panel stiffness. Glass panel stiffness is a significant contributor to high speed aerodynamic blow out performance in a frameless glass system (stiffer is better). This situation may also require a higher level of seal structural member engagement to achieve acceptable aerodynamic blow out performance, which may result in issues with door open-ability (as above). 3.) Some vehicles have doors with non-traditional hinge angles or more complex opening motion where the doors swing upward in addition to (or instead of) outward upon opening. These types of doors can generally be found on high performance vehicles and are sometimes referred to as "scissor", "butterfly" or "swan" doors. Systems such as these may require a more sophisticated index trigger mechanism or closer coordination between the window regulator and door latch to ensure that the glass has dropped sufficiently in time to allow the door to open freely under normal operating conditions. If situations arise where the glass indexing system fails (i.e. vehicle is involved in an accident, door glass is frozen, vehicle battery has low voltage or there is a failure within the electrical or mechanical system) it may be necessary to break the door glass to open the door, which is not an ideal situation. 4.) Vehicles with side door glass that is more vertical in orientation (front view angle—commonly referred to as "tumblehome" angle) generally have a smaller difference between glass blow out direction and door opening direction. This tends to shrink the design space available, likely resulting in a less robust balance between glass sealing, door open-ability and resistance to high-speed glass blow-out. 5.) Vehicles where the manufacturer desires to have a very small or no visible seal structural member (i.e. "flush glass" look) for appearance reasons.

Thus, a need exists for frameless door systems that meet the competing requirements of door opening ability and glass retention to reduce high speed wind noise.

SUMMARY OF THE INVENTION

One aspect of the present invention includes a vehicle having a vehicle body with a door pivotally coupled thereto at a door opening. The door includes a window, such as a frameless window. A seal member is at least partially disposed around the door opening and an actuator is coupled to the vehicle body adjacent the door opening. A structural member is operably coupled to the actuator for actuation between extended and retracted positions. The structural member is configured to retain the window against the seal member when the structural member is in the extended position.

Another aspect of the present invention includes a vehicle having a vehicle body with a roof frame. A door is pivotally coupled to the vehicle body and includes a frameless window. An actuator is coupled to the roof frame adjacent the frameless window. A retainer member is coupled to the actuator for actuation between engaged and disengaged positions relative the frameless window. A controller is configured to control the actuator for moving the retainer member to the engaged position based on an activation signal received by the controller.

Yet another aspect of the present invention includes a vehicle having a door opening with a frame. A door is mounted adjacent the door opening and includes a frameless window. An actuator is coupled to the frame and further coupled to a retainer member. The retainer member is moveable between engaged and disengaged positions relative to the frameless window as powered by the actuator. A controller is configured for determining whether an instantaneous vehicle condition is met, and moving the retainer member to the engaged position to retain the frameless window against the frame when the vehicle condition is detected.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1A:
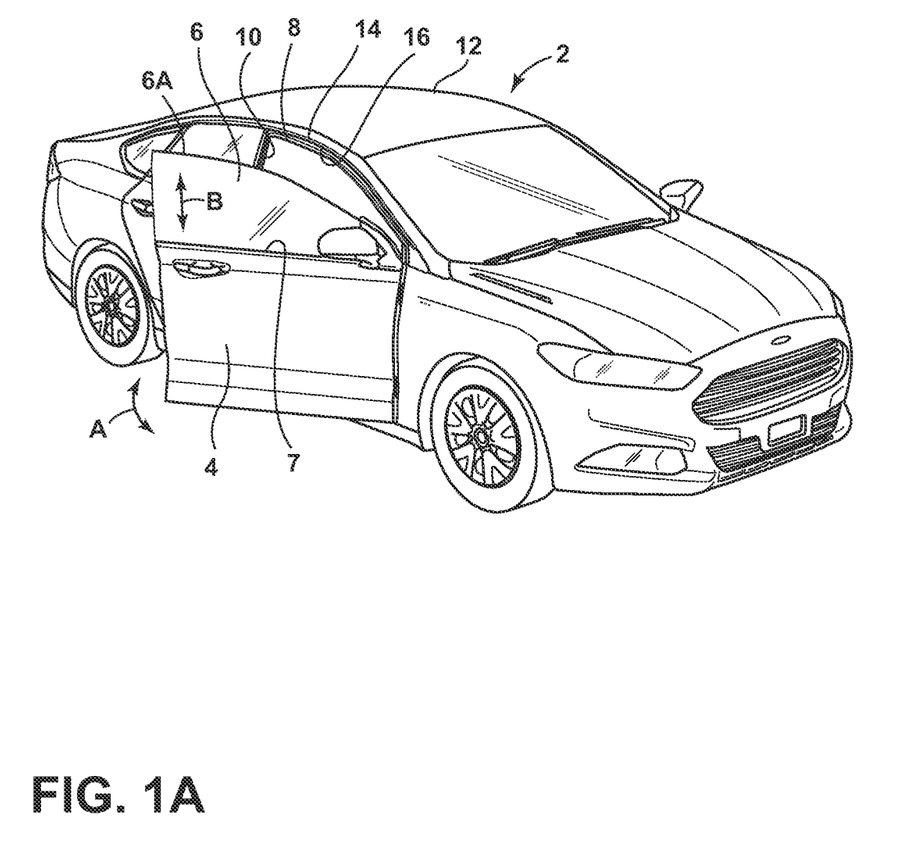
FIG. 1A is a perspective view of a motor vehicle showing a passenger-side door with a frameless window in an open position.

For purposes of description herein, the terms "upper," "lower," "right," "left," "rear," "front," "vertical," "horizontal," and derivatives thereof shall relate to the invention as oriented in FIG. 1A. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1A, a motor vehicle 2 is shown having a door 4 pivotally mounted thereto between open and closed positions along a door swing path as indicated by arrow A. The door 4 includes a frameless window 6 which is configured for vertical movement relative to the door 4 in the direction as indicated by arrow B. The window 6 is considered "frameless" in that no structural frame exists above the belt line 7 of the door 6. The door 4 is considered a frameless door, wherein the frameless window 6 is generally comprised of a glass pane, a laminated glass pane, a polymeric pane, or other like material suitable for use as a window. In FIG. 1A, the frameless window 6 is shown in a full up position and includes an upper edge 6A aligned for sealing engagement with a seal member 8 disposed around a door opening 10 disposed on a vehicle body 12. The door shown in FIG. 1A is contemplated to be a passenger-side door having a frameless window 6, however, it is contemplated that any door disposed on the motor vehicle 2 can include a retaining system of the present concept, as further described below.

Figure 1B:
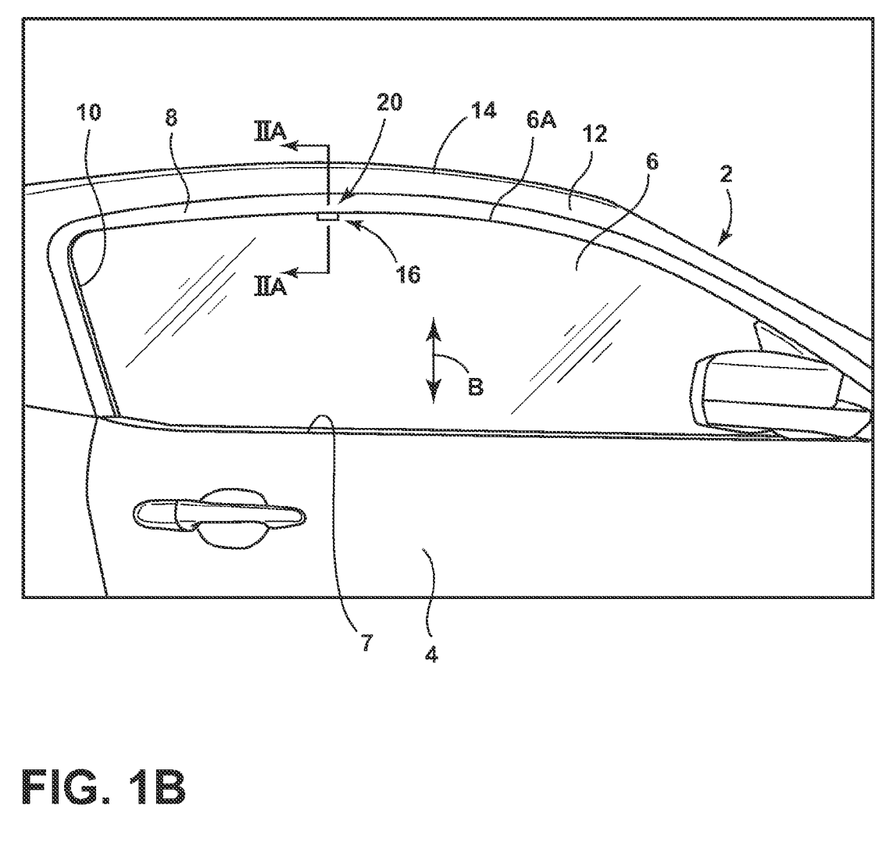
FIG. 1B is side elevational view of the passenger-side door of FIG. 1A with the door shown in a closed position.

Referring now to FIG. 1B, the door 4 is shown in a closed position relative to the door opening 10 of the vehicle body 12. The vehicle body 12 further includes a frame 14 which defines a roof structure for mounting the seal member 8 at least partially around the door opening 10. In the closed position, the door 4 is configured to have the window 6 seal against the seal member 8 to close off the motor vehicle 2 from the outside elements. As noted above, a frameless door system is more susceptible to high speed wind noise and may present issues with glass blowout performance at various pressures experienced by the motor vehicle 2, particularly when the motor vehicle 2 is travelling at high speeds. As such, the seal member 8 must be a seal member that properly seals the window 6 to the vehicle body 12, yet allows a user to freely open and close the door 4 without impediment by the structure of the seal member 8. For these purposes, as shown in FIG. 1B, the motor vehicle 2 includes an active glass retention system 20 for use in properly retaining the window 6 to the vehicle body 12 at location 16, as further described below.

The glass retention system 20 of the present concept may include a number of forms used to physically or positively capture a window piece and retain that window piece against a door opening, generally along a portion of a seal member. The glass retention system 20 of the present concept may be triggered automatically by a controller sensing a particular vehicle condition, such as high speed travel or pressure changes detected by a controller. A user initiated trigger can also be used with the system, wherein a vehicle condition is initiated by a user which triggers the glass retention system 20 to positively capture a window piece, in any one of the manners as described below.

Figure 2A:
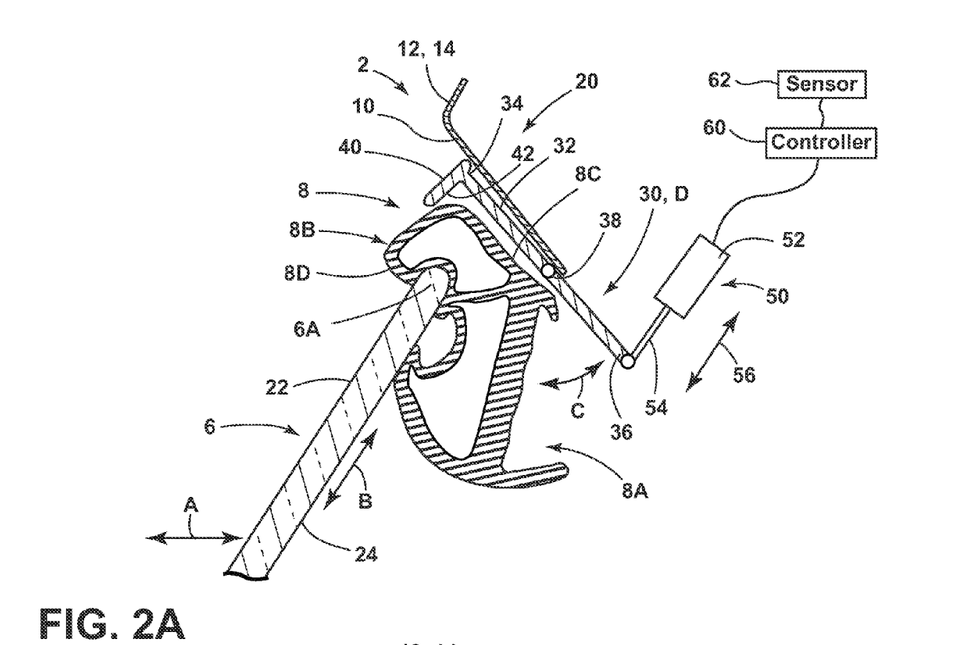
FIG. 2A is a cross-sectional view of the frameless window and sealing arrangement taken from line IIA of FIG. 1B showing a retainer member in a disengaged position.

Referring now to FIG. 2A, the window 6 is shown in a full up position and sealed against the seal member 8. In the embodiment shown in FIG. 2A, the seal member 8 includes an inner portion 8A and an outer portion 8B, wherein the upper edge 6A of the window 6 is received between the inner and outer portions 8A, 8B of the seal member 8 when the door 4 (FIG. 1B) is in the closed position. Thus, the position of the window 6 relative to the seal member 8 in FIG. 2A correlates to the window 6 being in a full up position on the door 4, with the door 4 in a closed position relative to the vehicle body 12. In this way, the window 6 is shown generally sealed against the door opening 10 of the motor vehicle 2. The seal member 8 further includes an upper portion 8C which is generally connected to the vehicle body 12 at frame 14 around the door opening 10. The outer portion 8B of the seal member 8 includes a lip 8D which is configured to wrap around the upper edge 6A of the window 6 when the vehicle door 4 is in the closed position. The lip 8D of the seal member 8 is designed to seal against an exterior side 22 of the window 6 when the door 4 is in the closed position. The lip 8D is configured to allow for free movement of the window 6 between open and closed positions, and for this reason the outer portion 8B of the seal member 8 is less substantial than the inner portion 8A of the seal member 8. A more robust outer portion would generally inhibit the ability of the window 6 to fully close against the vehicle body 12, as such a robust feature would be difficult to receive the upper edge 6A of the window 6 without prior lowering of the window 6 in a complex indexing system, as described above. As further shown in FIG. 2A, the inner portion 8A of seal member 8 seals against an interior side of the window 6 when the door 4 is in the closed position and the window 6 is in the full up position. The outer portion 8B of the seal member 8 is an optional portion of the seal member 8, and may not be included in certain embodiments for design considerations and/or to eliminate/reduce interaction of the seal member 8 and window 6 when opening and closing the door 4.

With further reference to FIG. 2A, the glass retention system 20 includes a retainer member 30 which is a structural member having sufficient rigidity to retain the window 6 in the up and closed position as shown in FIG. 2A. The retainer member 30, shown in FIG. 2A, includes a body portion 32 having a first end 34 and a second end 36. The body portion 32 of the retainer member 30 is pivotally coupled to the vehicle body 12 at frame 14 adjacent the door opening 10. The pivotal coupling of the retainer member 30 is shown at a pivot point 38 of the body portion 32. As pivotally coupled to the vehicle body 12, the retainer member 30 is configured for movement along an actuation path as indicated by arrow C. Disposed adjacent to the first end 34 of the body portion 32 of the retainer member 30, a retaining flange 40 extends outwardly from the body portion 32 of the retainer member 30. In the configuration shown in FIG. 2A, the retaining flange 40 is substantially perpendicular to the body portion 32 of the retainer member 30. As inner surface 42 of the retaining flange 40 defines an engagement portion of the retainer member 30 configured to contact the window 6 for retention thereof.

In assembly, the retainer member 30 is substantially covered by the seal member 8 at upper portion 8C of the seal member 8. In this way, the retainer member 30 is substantially concealed in assembly. In FIG. 2A, the retainer member 30 is shown in a disengaged position D, wherein no part of the retainer member 30 inhibits movement of the frameless window 6 between open and closed positions on the door swing path as indicated by arrow A. Further, the retainer member 30 does not inhibit movement of the frameless window 6 along the vertical path indicated by arrow B between up and down positions. As further shown in FIG. 2A, the second end 36 of the body portion 32 of the retainer member 30 is coupled to an actuator 50 which, in the embodiment of FIG. 2A, includes a motor 52 having a piston rod 54 which extends and retracts relative to the motor 52 in the direction as indicated by arrow 56. The coupling of the piston rod 54 to the body portion 32 of the retainer member 30 is contemplated to be a pivoting coupling to account for the pivoting rotation of the body portion 32, of the retainer member 30 as pivotally coupled to the vehicle body 12 at pivot point 38.

Figure 2B:
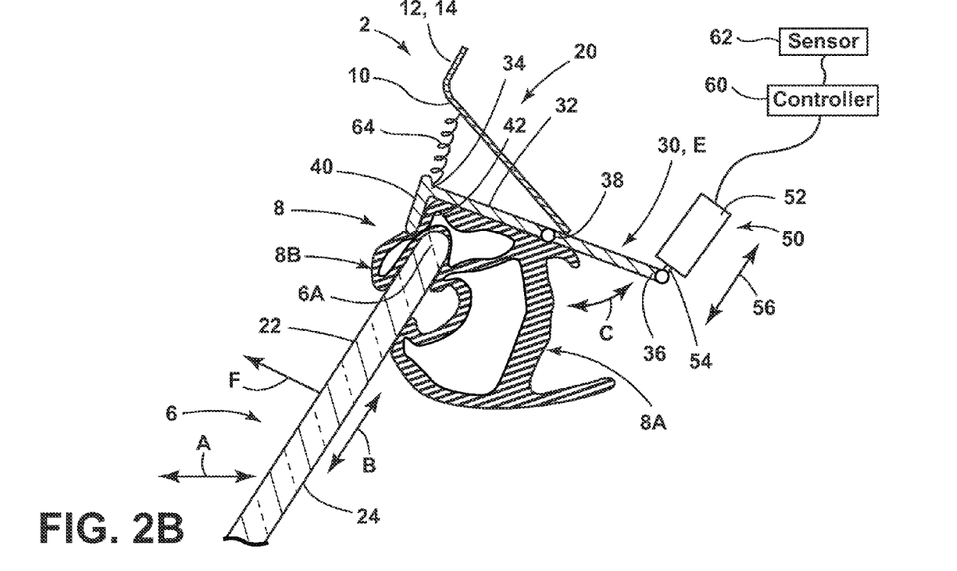
FIG. 2B is a cross-sectional view of the frameless window of FIG. 2A showing the retainer member in an engaged position.
Figure 3:
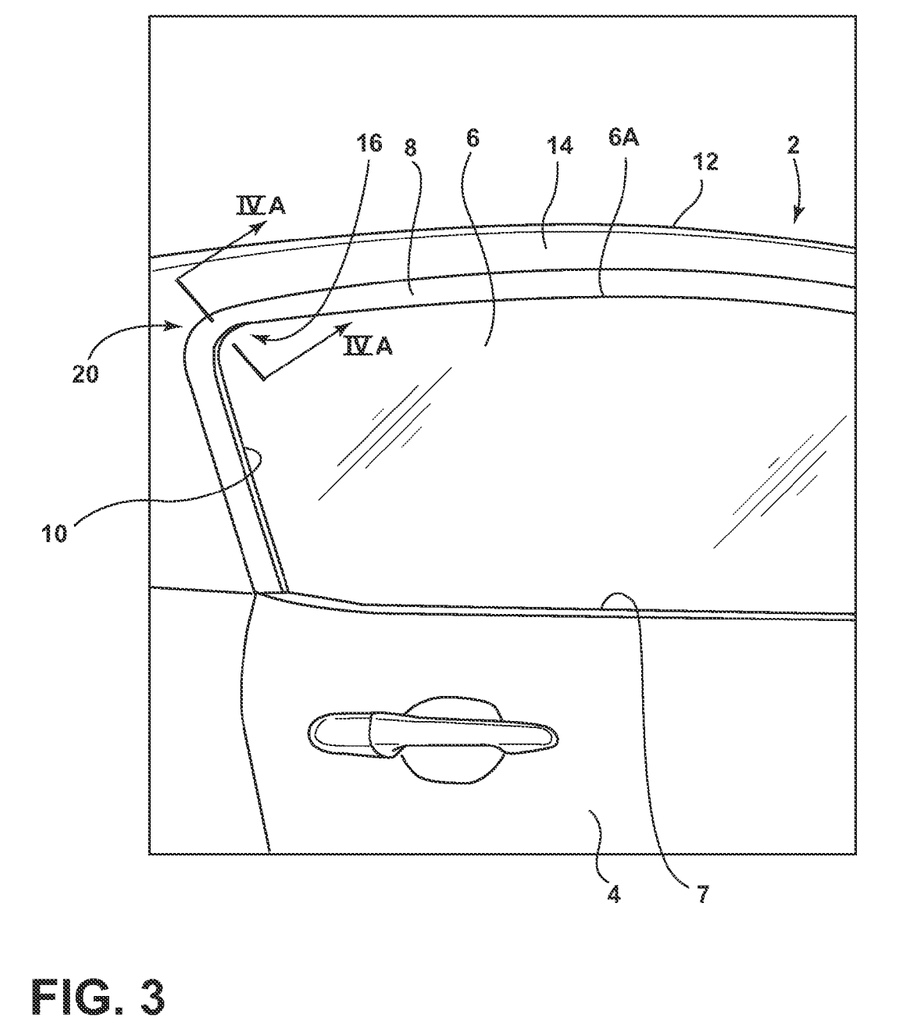
FIG. 3 is a side elevational view of a passenger-side door shown in a closed position, wherein the door includes a frameless window.

Referring now to FIG. 2B, the retainer member 30 is shown in the engaged position E, wherein the retaining flange 40 is rotated downward towards the upper edge 6A of the frameless window 6, to positively capture the frameless window 6 along the upper edge 6A thereof. Thus, the retainer member 30 is moveable between disengaged and engaged positions D, E (FIGS. 2A, 2B) as actuated by the actuator 50 along actuation path C. The actuator 50 may include any type of actuator capable of pivoting the retainer member 30 in the manner shown from FIG. 2A to FIG. 2B. Such an actuator 50 may include a solenoid, an electric motor, or the use of a vacuum or pressure to move the retainer member 30 from the disengaged position D to the engaged position E. In the embodiment shown in FIG. 2B, the inner surface 42 of the retaining flange 40 contacts and compresses the outer portion 8B of seal member 8 to positively capture the upper edge 6A of the frameless window 6 in an effort to retain the window 6 against aerodynamic lifting forces indicated by arrow F. The aerodynamic lifting forces F can be realized, as noted above, when the motor vehicle 2 is moving at a high rate of speed. Under these conditions, the frameless window 6 will tend to pull away from the vehicle body 12 which reduces the ability of the frameless window 6 to seal against the vehicle body 12. With the retainer member 30 in the engaged position E, the window glass 6 is positively captured by the retainer member 30 at retaining flange 40 against such aerodynamic lifting forces F.

The competing requirements for door open-ability and high speed wind noise reduction ("glass blow-out") are addressed separately by the glass retention system 20 of the present concept. In one embodiment of the system 20, the retainer member 30 is configured to engage the frameless window 6 when a predetermined highway speed is reached by the motor vehicle 2. In this way, the glass retention system 20 is configured to prevent glass blow-out and reduce wind noise when an instantaneous vehicle condition, such as the motor vehicle 2 exceeding a threshold speed limit, is detected by a controller 60 (FIGS. 2A, 2B). When a particular vehicle condition is detected by the controller 60, the controller 60 can send an activation signal to the actuator 50 to actuate the retainer member 30 to the engaged position E (FIG. 2B). When the vehicle condition is no longer detected by the controller 60, the activation signal can be removed, thereby causing the actuator 50 to move the retainer member 30 to the disengaged position D (FIG. 2A). In this way the retainer member 30 is an "active" member that is actuated by the actuator 50 when a control command or activation signal is sent out by the controller 60 based on a circumstance or vehicle condition being detected, as further described below. In the disengaged position D, the retainer member 30 does not impede the opening and closing movement of the door 4 along door swing path A by interfering with the upper edge 6A of the window 6. Thus, when the retainer member 30 is in the disengaged position D (FIG. 2A), the upper edge 6A of the window 6 will clear the structure of the retainer member 30 for unencumbered movement of the door 4 between open and closed positions.

The retainer member 30 is shown in FIGS. 2A, 2B as a structural part configured to pivot relative to the vehicle body 12. It is further contemplated that the other embodiments of a retainer member can include a structural part that translates (FIGS. 4A-5B) or rotates (FIGS. 6A-7B) to engage the frameless window 6, as further described below.

Further, a four-bar linkage can be used to move the retainer member 30 between engaged and disengaged positions using similar motion relative to the pivoting action described below with reference to the retainer member 30 shown in FIGS. 2A, 2B. The engagement of the retainer member 30 and the window 6 could comprise pre-loading the window 6 to the seal member 8 or by simply restricting extreme movement of the window 6 in an off-set or non-contacting manner. A contact engagement of the retainer member 30 is shown in FIG. 2B with the inner surface 42 of the retaining flange 40 contacting the window 6 indirectly through the outer portion 8A of seal member 8. Direct contact is also contemplated between the inner surface 42 of the retaining flange 40 and the glass 6, or the inner surface 42 of the retaining flange 40 may include a flock, or other flexibly resilient member, on the engagement portion when contacting the exterior side 22 of the frameless window 6 in the engaged position E. In assembly, the retainer member 30 is contemplated to be placed at a location along the upper edge 6A of the frameless window 6 where the window 6 is most likely to displace during aerodynamic loading, such as the general midpoint location 16 disposed along the upper edge 6A of the frameless window 6 as shown in FIG. 1B.

As noted above, and shown in FIG. 2A, the retainer member 30 is disengaged from the window 6 in its disengaged position D (neutral position, ground state or retracted position) to allow unencumbered failsafe opening and closing of the door 4. The retainer member 30 could be moved to the engaged position E (deployed position, active position, extended position) by the detection of a vehicle condition by the controller 60. Activation of the retainer member 30 could be triggered by the motor vehicle 2 exceeding a certain threshold vehicle speed, aerodynamic pressure reading(s) sensed by a sensor 62 coupled to the controller 60, direct aerodynamic pressure/vacuum detected, door lock activation by the user, glass displacement detected, or other like vehicle condition. In order to maintain failsafe operation, a continuous activation of the retainer member 30 is utilized during deployment of the retainer member 30, and a passive energy storage device or biasing mechanism 64 (e.g. a spring), shown in FIG. 2B, may be used to return the retainer member 30 to its disengaged position D when the activation signal from the controller 60 is removed. Removal of the activation signal to the actuator 50 from the controller 60 would likely be triggered by a similar (if not opposite) vehicle condition relative to the initiating vehicle condition (i.e. reduced vehicle speed, aerodynamic pressure reading(s) sensed by the sensor 62 coupled to the controller 60, direct aerodynamic pressure/vacuum detected, door lock activation/event (automatically or user-initiated), glass displacement detected, or other like vehicle condition). The sensor 62 can include one or more sensors and is contemplated to be, in one embodiment, a pressure sensor configured to detect aerodynamic lifting forces F (FIGS. 2A, 2B) acting on the window 6. The sensor 62 may also include a position sensor configured to detect a displacement of the window 6 relative to a control position or a sealed position with seal member 8. Using a position sensor 62, the controller 60 can activate the actuator 50 to move the retainer member 30 to the engaged position E based on a predetermined threshold of displacement of the window 6 being detected by the position sensor 62. The sensor 62 may also include a vehicle speed sensor configured to determine if the motor vehicle 2 has exceeded a predetermined or threshold speed, in which case the controller 60 can activate the actuator 50 to move the retainer member 30 to the engaged position E to retain the window 6 in a sealed engagement for the duration of the high speed interval.

Figure 4A:
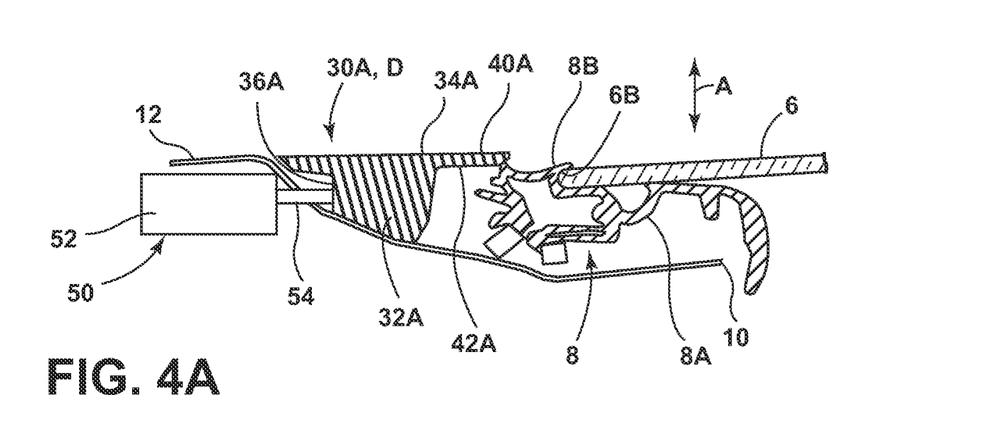
FIG. 4A is a cross-sectional view of the frameless window of FIG. 3 taken at line IVA with a retainer member shown in a retracted position.
Figure 4B:
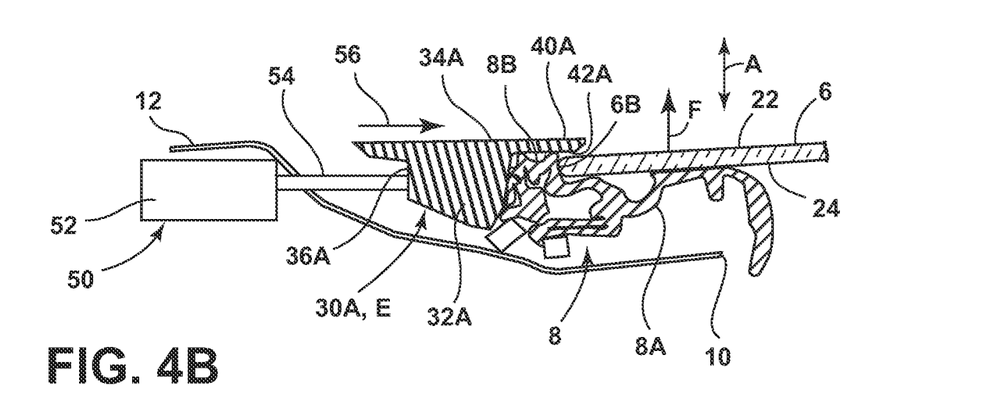
FIG. 4B is a cross-sectional view of the frameless window of FIG. 4A with the retainer member shown in an engaged position.

Referring now to FIGS. 4A and 4B, another embodiment of the retainer member 30A is shown in a disengaged position D (FIG. 4A) and an engaged position E (FIG. 4B). The retainer member 30A is contemplated to be a structural member which slides laterally from the disengaged position D to the engaged position E in a direction as indicated by arrow 56. The retainer member 30A includes first and second sides 34A, 36A, with an engagement flange 40A having an inner surface 42A disposed off of the first side 34A. The retainer member 30A is coupled to an actuator 50 at a piston rod 54, which is coupled to the retainer member 30A near the second side 36A of the retainer member 30A. In the embodiment shown in FIGS. 4A, 4B a rear edge 6B of the window 6 is shown engaged with seal member 8 in assembly. With specific reference to FIG. 4B, the retaining flange 40A of the retainer member 30A is shown disposed outwardly from the exterior surface 22 of the window 6 to retain the window 6 in a sealed position against the vehicle body 12 by the inner surface or engagement portion 42A of the retaining flange 40A being in contact or slightly offset from the exterior surface 22 of the window 6. Thus, in the engaged position E shown in FIG. 4B, the retainer member 30A is able to retain the window 6 in a sealed engagement with the vehicle body 12 against aerodynamic forces F acting to displace the window 6 under specific vehicle conditions.

Figure 5A:
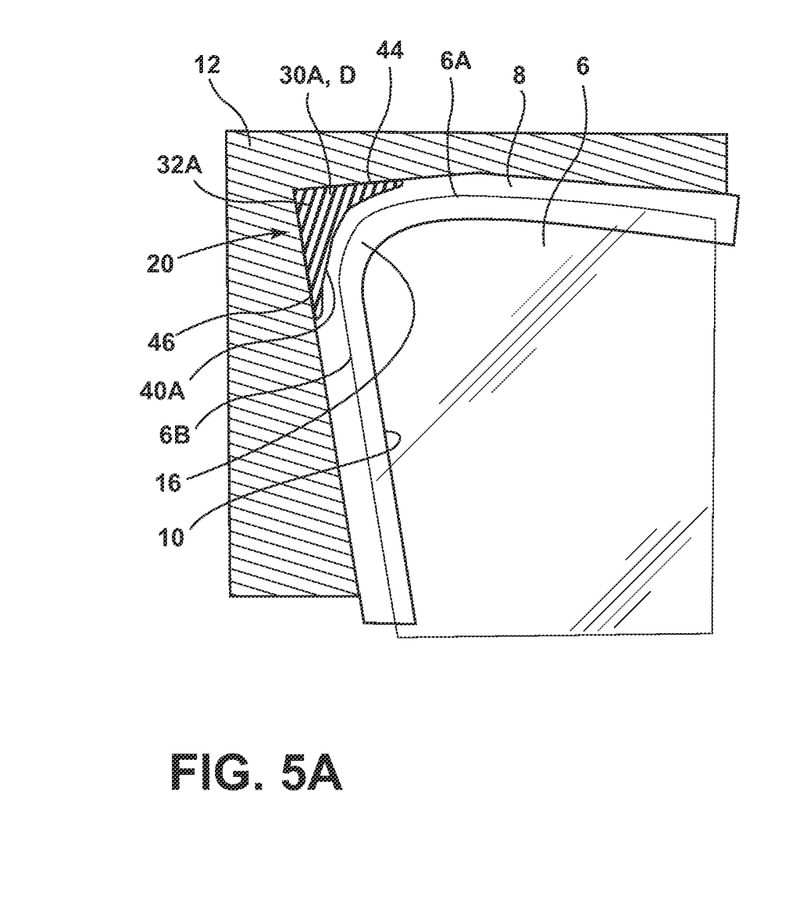
FIG. 5A is a side elevational view of a vehicle door in a closed position and having the frameless window of FIG. 4A, with the retainer member in a retracted position relative to the frameless window.
Figure 5B:
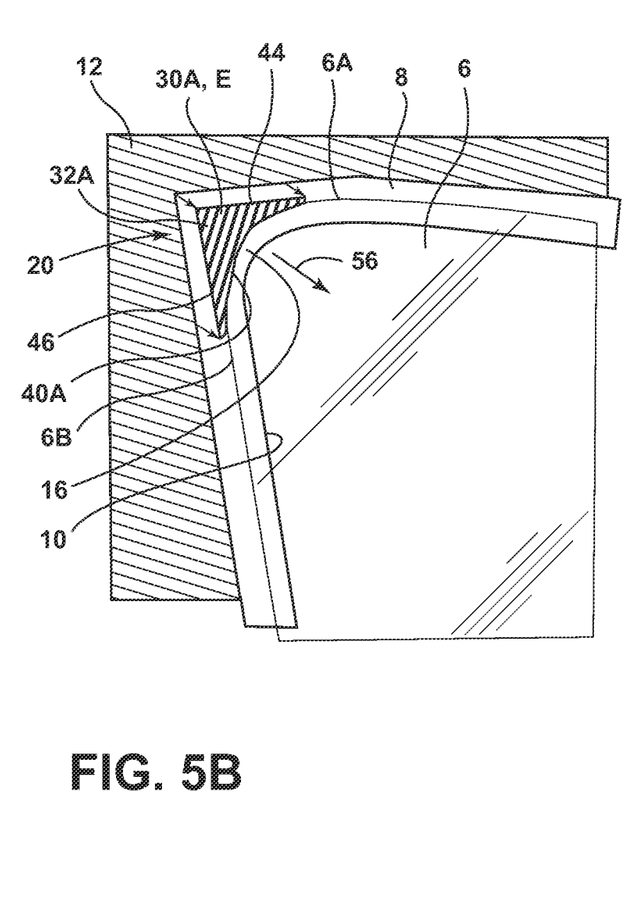
FIG. 5B is a side elevational view of the vehicle door FIG. 5A showing the retainer member in an extended an engaged position with the frameless window.

Referring now to FIGS. 5A and 5B, the window retention system 20 is shown with the retainer member 30A disposed near an upper rear corner of the door opening 10, wherein the retainer member 30A includes a body portion 32A, and further wherein retaining flange 40A extends along first and second legs 44, 46 of the retainer member 30A. The first and second legs 44, 46 of the retainer member 30A are substantially perpendicular to one another and are configured to engage the upper edge 6A and rear edge 6B of the window 6, respectively. With specific reference to FIG. 5B, the retainer member 30A is shown in the engaged position E, wherein the first leg 44 of the retainer member 30A is engaged with the upper edge 6A of the window 6, while the second leg 46 of the retainer member 30A is engaged with the rear edge 6B of the window 6. In this way, the retainer member 30A engages the window 6 along two distinct edges (edges 6A and 6B) of the window 6, to provide improved retention of the window 6 during a particular vehicle condition. The detection of a particular vehicle condition causes the controller 60 to move the retainer member 30A from the disengaged position D to the engaged position E. As shown in FIG. 5B, the actuation path 56 of the retainer member 30A is a forward and downward path for acting on the upper rear corner 16 of the window 6. This movement of the retainer member 30A is also described herein as movement between retracted an extended positions, wherein the retainer member 30A engages the window 6 in the extended position (FIG. 5B), and allows for proper door movement in the retracted position (FIG. 5A). While the embodiment of the retainer member 30A is shown in FIGS. 5A and 5B being disposed near an upper rear corner 16 of the window 6, it is contemplated that the retainer member 30A could also be disposed adjacent to any edge of the window 6 for engagement thereof.

Figure 6A:
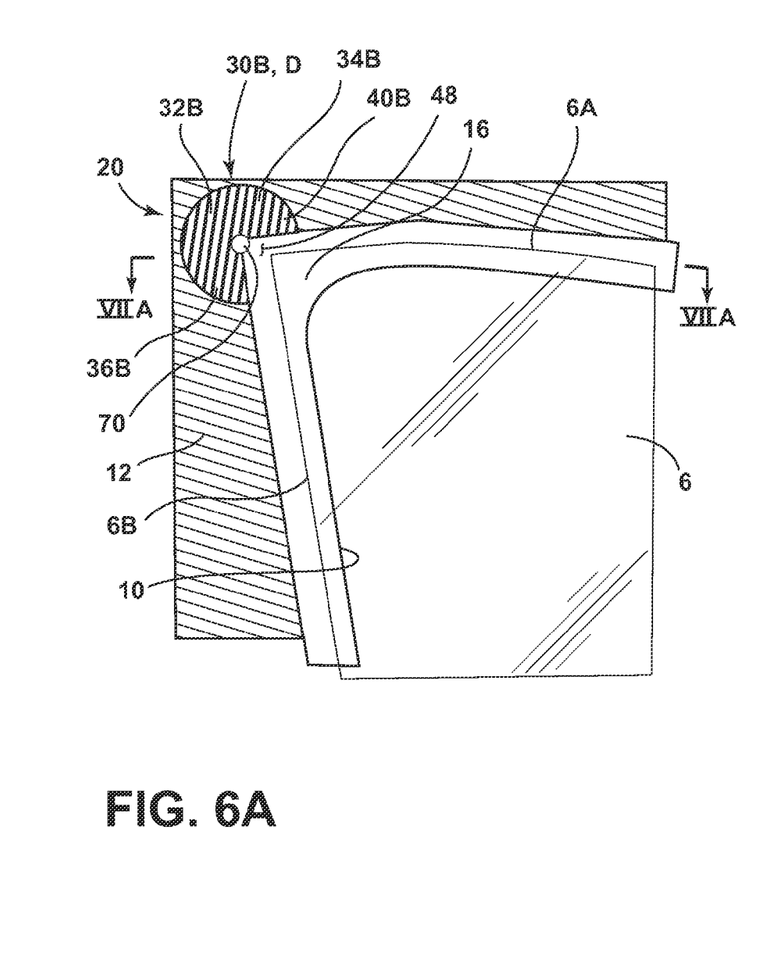
FIG. 6A is a side elevational view of a vehicle door in a closed position and having a frameless window, and further showing a retainer member in a disengaged position relative to the frameless window.
Figure 6B:
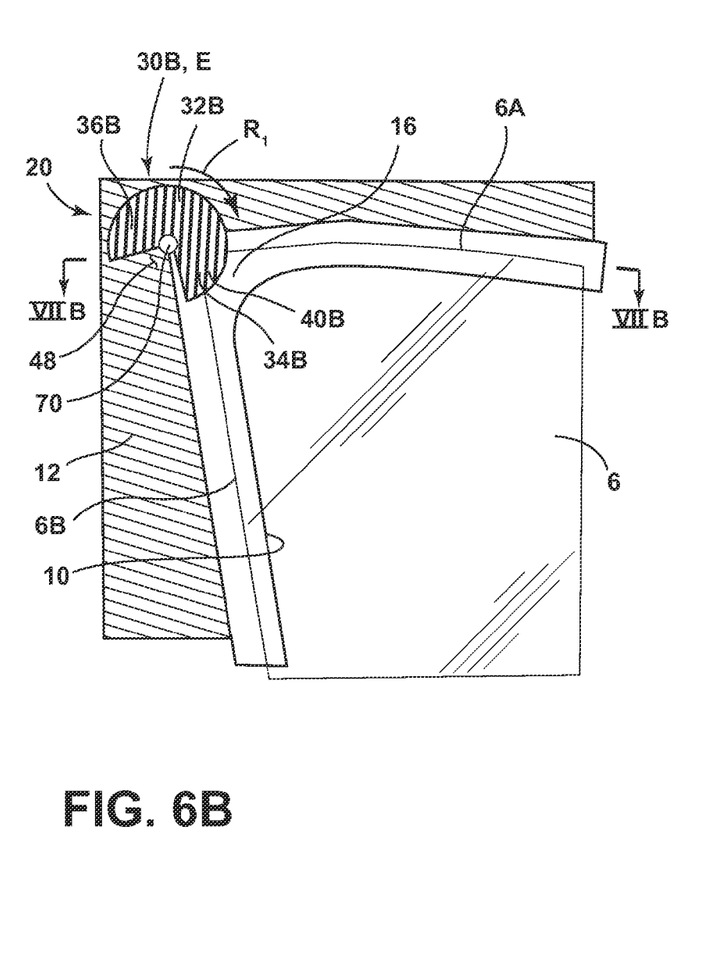
FIG. 6B is a side elevational view of the vehicle door FIG. 6A showing the retainer member in an engaged an engaged position with the frameless window.

Referring now to FIGS. 6A and 6B, another embodiment of a window retention system 20 is shown with a retainer member 30B disposed near an upper rear corner of the door opening 10. In the embodiment shown in FIGS. 6A and 6B, the retainer member 30A includes a disc-shaped body portion 32B having first and second sides 34B, 36B, and a retaining flange 40B disposed near the first side 34B of the retainer member 30B. It is further contemplated that the retaining flange 40B can be disposed near the second side 36B of the retainer member 30B, or dual retaining flanges can be located on both the first and second sides 34B, 36B to offer different levels of retention of the window 6 based on a selected rotation of the retainer member 30B. A relief portion 48 of the disc-shaped body portion 32B is disposed between the first and second sides 34B, 36B of the body portion 32B. With specific reference to FIG. 6A, the retainer member 30B is shown in the disengaged position D, wherein the relief portion 48 of the disc-shaped body portion 32B is disposed adjacent to the upper rear corner 16 of the window 6 to allow for free movement of the door 4. With specific reference to FIG. 6B, the retainer member 30A has been rotated from the disengaged position (FIG. 6A) to the engaged position E along actuation path $R_1$. In the engaged position E, the first side 34B of the retainer member 30B is engaged with the upper edge 6A and the rear edge 6B of the window 6 at retaining flange 40B. In this way, the retainer member 30b engages the window 6 along two distinct edges (edges 6A and 6B) of the window 6, to provide improved retention of the window 6 during a particular vehicle condition. The movement of the retainer member 30B along actuation path $R_1$ is provided by a rotating movement of an actuator, as further described below.

Figure 7A:
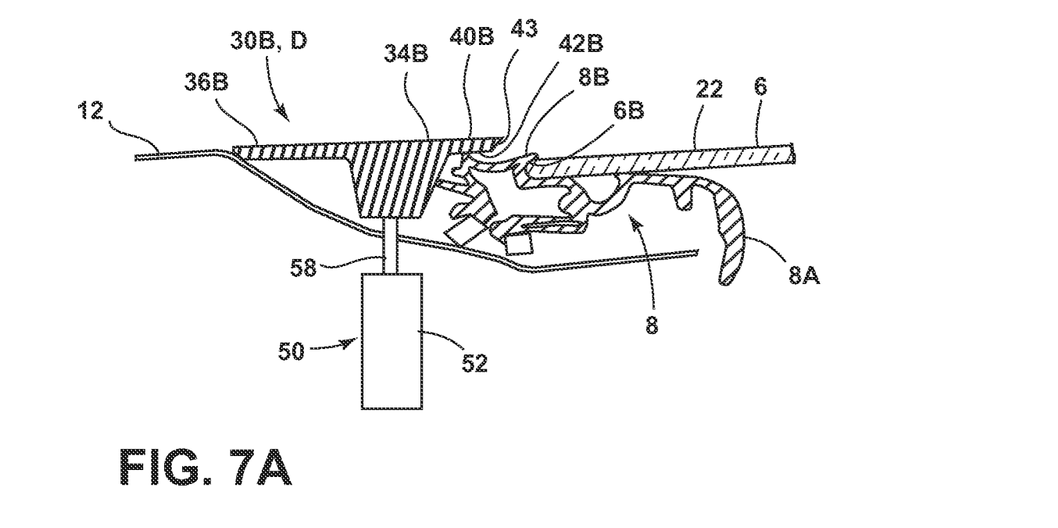
FIG. 7A is a cross-sectional view of the frameless window of FIG. 6A taken at line VIIA with the retainer member shown in the disengaged position.
Figure 7B:
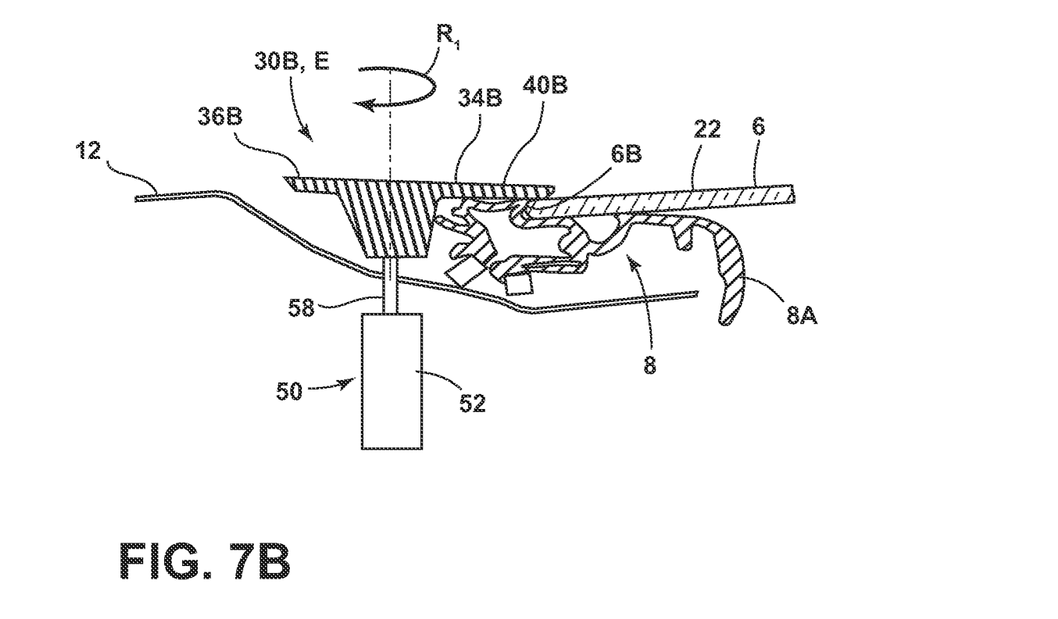
FIG. 7B is a cross-sectional view of the frameless window of FIG. 6B taken at line VIIB with the retainer member shown in the engaged position.

Referring now to FIGS. 7A and 7B, the retainer member 30B is shown in a disengaged position D (FIG. 7A) and an engaged position E (FIG. 7B). As noted above, the retainer member 30B is contemplated to be a structural member, which rotates between the engaged and disengaged positions E, D. The retainer member 30B includes first and second sides 34A, 36A, with engagement flange 40B having an inner surface 42B disposed near of the first side 34B. The inner surface 42B defines and engagement portion of the retainer member 30B and further includes a lead-in or angled surface 43 having a wedged configuration for ease of engagement with the exterior surface 22 of the window 6. The retainer member 30B is shown coupled to an actuator 50 at a driveshaft 58. The driveshaft 58 is coupled to the retainer member 30B at a central portion thereof and configured to rotate the retainer member 30B along actuation path $R_1$ between the disengaged position D (FIG. 7A) and the engaged position E (FIG. 7B). While the embodiment of the retainer member 30B is shown in FIGS. 7A and 7B being disposed near an upper rear corner 16 of the window 6, it is contemplated that the retainer member 30B could also be disposed adjacent to any edge of the window 6 for engagement thereof.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle comprising:
   a vehicle body having a door pivotally coupled thereto at a door opening, the door including a window having interior and exterior sides and an upper edge;
   a seal member at least partially disposed around the door opening and having inner and outer portions for receiving the upper edge of the window therebetween when the window is in a full up position, wherein the inner and outer portions of the seal member are configured to seal against the interior and exterior sides of the window when the door is in a closed position and the window is in the full up position;
   an actuator coupled to the vehicle body adjacent the door opening; and
   a structural member operably coupled to the actuator for actuation between extended and retracted positions, wherein the structural member includes an engagement portion configured to engage one of the outer portion of the seal member and the exterior side of the window when the structural member is in the extended position to retain the window against the seal member.

2. The vehicle of claim 1, wherein the structural member includes a body portion having a retaining flange disposed along first and second legs of the body portion.

3. The vehicle of claim 2, wherein the retaining flange of the first and second legs of the body portion of the structural member are configured to engage an upper edge and a rear edge, respectively, of the window when the structural member is in the extended position.

4. The vehicle of claim 1, including:
a controller configured to control the actuator for moving the structural member to the extended position based on an activation signal.

5. A vehicle, comprising:
a vehicle body having a roof frame;
a door having a frameless window coupled to the vehicle body;
an actuator coupled to the roof frame adjacent the frameless window;
a retainer member coupled to the actuator for actuation between engaged and disengaged positions relative to the frameless window, wherein the retainer member includes a body portion having first and second sides with a relief portion disposed between the first and second sides; and
a controller configured to control the actuator for moving the retainer member to the engaged position based on an activation signal.

6. The vehicle of claim 5, wherein the frameless window includes one of a corner and an edge, or both, and further wherein the corner or edge of the frameless window is received through the relief portion of the retainer member when the retainer member is in the disengaged position to allow for opening and closing of the door.

7. The vehicle of claim 6, wherein the retainer member includes an engagement flange disposed on one of the first side and second side of the retainer member, and further wherein the engagement flange is configured to engage an exterior side of the frameless window when the retainer member is in the engaged position.

8. The vehicle of claim 6, wherein the retainer member includes an engagement flange disposed on the first side of the retainer member, and further wherein the engagement flange is configured to engage one of an upper edge and a rear edge, or both the upper edge and the rear edge of the frameless window when the retainer member is in the engaged position.

9. The vehicle of claim 7, wherein the body portion of the retainer member is a disc-shaped body portion and further wherein the retainer member is rotated by the actuator between engaged and disengaged positions.

10. The vehicle of claim 5, wherein the body portion of the retainer member includes a retaining flange, and further wherein the retainer member is pivoted by the actuator between engaged and disengaged positions.

11. The vehicle of claim 10, wherein the body portion of the retainer member is coupled to a biasing mechanism to bias the retainer member to the disengaged position.

12. A vehicle, comprising:
a door opening having a frame;
a door mounted adjacent the door opening having a frameless window;
an actuator coupled to the frame;
a retainer member coupled to the actuator and moveable between engaged and disengaged positions relative to the frameless window, wherein the retainer member includes a body portion having first and second sides with a relief portion disposed between the first and second sides;
a controller:
determining whether an instantaneous vehicle condition is met; and
moving the retainer member to the engaged position to retain the frameless window when the vehicle condition is detected.

13. The vehicle of claim 12, including:
one or more sensors coupled to the controller for detecting the vehicle condition.

14. The vehicle of claim 13, wherein the one or more sensors includes one of a position sensor, a pressure sensor, and a vehicle speed sensor.

15. The vehicle of claim 14, wherein the instantaneous vehicle condition includes one of the vehicle exceeding a predetermined speed, a displacement of the frameless window from a sealed position, a door locking event, and an aerodynamic lifting force exceeding a threshold force realized on the frameless window.

* * * * *